US008442256B2

(12) United States Patent
Yoshino

(10) Patent No.: US 8,442,256 B2
(45) Date of Patent: May 14, 2013

(54) BOUNDARY MICROPHONE AND DESKTOP ELECTRO-ACOUSTIC TRANSDUCER

(75) Inventor: Satoshi Yoshino, Tokyo (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 334 days.

(21) Appl. No.: 12/788,880

(22) Filed: May 27, 2010

(65) Prior Publication Data

US 2010/0303272 A1 Dec. 2, 2010

(30) Foreign Application Priority Data

Jun. 1, 2009 (JP) ................................ 2009-132380

(51) Int. Cl.

| | |
|---|---|
| ***H04R 3/00*** | (2006.01) |
| ***H04R 9/08*** | (2006.01) |
| ***H04R 11/04*** | (2006.01) |
| ***H04R 17/02*** | (2006.01) |
| ***H04B 1/40*** | (2006.01) |
| ***H04B 1/44*** | (2006.01) |

(52) U.S. Cl.

USPC ........... 381/357; 381/122; 381/355; 381/356; 381/361; 381/369; 455/77; 455/78

(58) Field of Classification Search ................. 381/357, 381/355, 361; 455/77

See application file for complete search history.

(56) References Cited

U.S. PATENT DOCUMENTS

| | | | | |
|---|---|---|---|---|
| 2,085,198 | A * | 6/1937 | Lindsay | 200/61.01 |
| 2,787,675 | A * | 4/1957 | Meshirer et al. | 381/355 |
| 2,984,713 | A * | 5/1961 | Swinehart | 381/123 |
| 3,586,798 | A * | 6/1971 | Holmes | 200/52 R |
| 4,032,844 | A * | 6/1977 | Imazeki | 455/77 |
| 4,199,721 | A * | 4/1980 | Ono et al. | 455/77 |
| 4,361,737 | A * | 11/1982 | Peterson | 381/363 |
| 4,434,507 | A * | 2/1984 | Thomas | 455/95 |
| 4,466,302 | A * | 8/1984 | Harris | 74/100.1 |
| 5,701,355 | A * | 12/1997 | Brannan et al. | 381/361 |
| 7,339,605 | B2 * | 3/2008 | Rodman et al. | 348/14.07 |
| 8,045,741 | B2 * | 10/2011 | Yoshino | 381/355 |
| 2005/0099391 | A1 * | 5/2005 | Nishino et al. | 345/161 |
| 2006/0007151 | A1 * | 1/2006 | Ram | 345/163 |
| 2008/0025532 | A1 * | 1/2008 | Yonehara et al. | 381/174 |
| 2008/0159578 | A1 * | 7/2008 | Akino et al. | 381/361 |
| 2011/0170727 | A1 * | 7/2011 | Akino et al. | 381/361 |

FOREIGN PATENT DOCUMENTS

| | | |
|---|---|---|
| JP | 10-187347 A | 7/1998 |
| JP | 3110083 U | 6/2005 |
| JP | 2008-288933 | 11/2008 |

* cited by examiner

*Primary Examiner* — David Warren
*Assistant Examiner* — Christina Russell
(74) *Attorney, Agent, or Firm* — Whitham Curtis Christofferson & Cook, PC

(57) ABSTRACT

A base having a flat shape; a support provided on a bottom surface of the base; a microphone unit incorporated in the base and converts sound into an electric signal; and a pressure sensitive switch with which an output signal from the microphone unit is turned on and off are included. At least one such pressure sensitive switch is provided to be pressed between the base and the support.

11 Claims, 12 Drawing Sheets

BOUNDARY MICROPHONE AND DESKTOP ELECTRO-ACOUSTIC TRANSDUCER

BACKGROUND OF THE INVENTION

1. Field of the Invention

The present invention relates to a boundary microphone and a desktop electro-acoustic transducer that have a pressure sensitive switch to turn on and off an output signal from a microphone unit.

2. Description of the Related Art

Desktop electro-acoustic transducers are available such as a boundary microphone and a speaker with attached microphone that have a pressure sensitive switch to turn on and off an output signal from a microphone unit, and are placed on a desk upon use. For example, Japanese Patent Application Publication 2008-288933 discloses an invention related to a boundary microphone. Upon use, a boundary microphone is placed on a desk or a floor in, for example, TV studio or a conference room, and thus is also called a surface mount microphone (on-surface sound pickup microphone). An electro-acoustic transducer such as a boundary microphone is usually placed on a desk upon use. Therefore, generally, a casing thereof is designed to be flat with restricted height, to be less noticeable, and incorporates a microphone unit and a circuit therefor.

For example, as illustrated in FIG. 12, a microphone casing 11 of a boundary microphone is designed to be flat, and is formed of: a base 10 made of metal with the upper surface side opened; and a microphone cover 20 that is a metal plate having a plurality of openings (sound wave guide hole), i.e., a punching plate, and covering the upper surface of the base 10. A microphone unit 31 is incorporated in the microphone casing 11. Generally, the microphone unit 31 is a capacitor microphone unit.

As illustrated in FIG. 12, generally, a desktop electro-acoustic transducer such as a boundary microphone has a switch 12 that is a push switch of an appropriate type such as a membrane type, a capacitance type, and a mechanical type. With the switch 12, a user can turn an output from the microphone unit 11 on and off. Among such push switches, a membrane type is popularly used in a desktop electro-acoustic transducer because operation sound is less likely to be mixed with a sound signal while the microphone is under operation.

Generally, a membrane type switch is formed of: a flexible conductive material such as a copper foil that bends upon being pressed by a user; and a substrate on which a pattern for detecting an electrical conduction is formed. The switch is turned on when the copper foil is pressed to be in contact with the pattern, and turned off when the pressing force is released and the copper foil returns to the original position with its elastic force.

As illustrated in FIG. 12, generally, the switch 12 of a desktop electro-acoustic transducer is provided on an inclined surface directed diagonally forward at an upper side of the desktop electro-acoustic transducer. The inclination makes the user's pressing force on the switch 12 more likely to be dispersed. Therefore, the switch may be difficult to be activated. If the switch 12 has a small area, or is provided in an inclined manner where the pressing force is likely to be dispersed as described above, the user may feel difficulty in pressing the switch 12. As a result, in an effort to activate the switch 12, the user may apply excessive pressing force on the switch 12 or, with a ballpoint pen or his or her finger nails, apply a pressing force focusing on a certain point on the switch 12. These may result in breaking the switch 12.

If it is difficult for the user to visually recognize that the area of the switch 12 on which the pressing is effective is limited, the user may not be able to press the effective area and thus may fail to turn on the switch. Therefore, upon designing a desktop electro-acoustic transducer, the switch 12 should be given a sufficient area. As a result, the size and the design of the main body of the desk-top electro-acoustic transducer could be unlimited.

SUMMARY OF THE INVENTION

An object of the present invention is to provide a boundary microphone and a desktop electro-acoustic transducer including a pressure sensitive switch and having an elaborated structure with which user friendliness is provided, a switch is less likely to be broken, and the size and the design of the main body thereof are not restricted.

A boundary microphone according to an aspect of the present invention includes: a base having a flat shape; a support provided on a bottom surface of the base; a microphone unit incorporated in the base and converts sound into an electric signal; and a pressure sensitive switch to turn on and off an output signal from the microphone unit. At least one such pressure sensitive switch is provided to be pressed between the base and the support.

A desktop electro-acoustic transducer according to an aspect of the present invention includes: a base having a flat shape; a support provided on a bottom surface of the base; an electro-acoustic transducing unit incorporated in the base; and a pressure sensitive switch with which an output signal from the electro-acoustic transducing unit is turned on and off. At least one such pressure sensitive switch is provided to be pressed between the base and the support.

In the present invention, the switch can be activated only by pressing the base, or the body of the boundary microphone or the desktop electro-acoustic transducer and thus is more user friendly. The switch is a pressure sensitive switch activated by being pressed between the base and the support. Thus, the switch activates with the tilting of the base as a result of pressing of the base, or the body of the boundary microphone or the desktop electro-acoustic transducer. Accordingly, a user can easily recognize the activation of the switch. As a result, breaking of the switch portion as a result of excessive pressing force applied thereto by the user can be prevented. Further, by the use of the pressure sensitive switch, a boundary microphone and a desktop electro-acoustic transducer of which the size and the design not restricted can be advantageously obtained.

DETAILED DESCRIPTION OF THE PREFERRED EMBODIMENTS

Embodiments of a boundary microphone and a desktop electro-acoustic transducer according to the present invention are described below with reference to the drawings.

Figure 1:
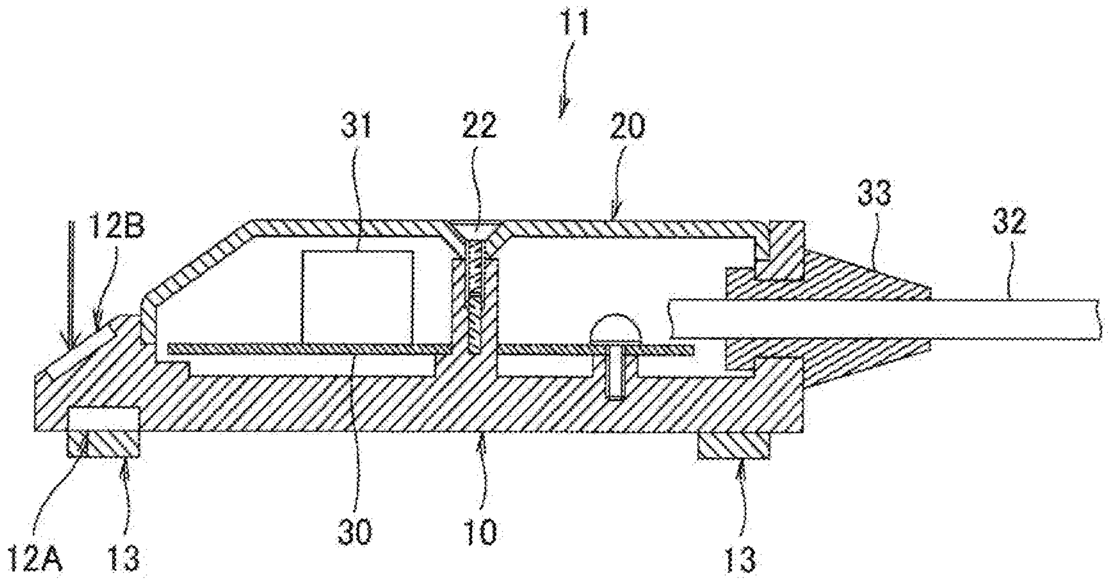
FIG. 1 is a cross-sectional view of an embodiment of a boundary microphone according to the present invention.

FIG. 1 exemplary illustrates an embodiment of a boundary microphone. The boundary microphone mainly includes: a microphone casing 11 designed to be flat with restricted height; supports 13; pressure sensitive switches 12A and 12B; a male screw 22; a circuit substrate 30; a microphone unit 31; a microphone cord 32; and a cord bush 33. The microphone casing 11 includes: a flat metallic base 10 of which the upper surface side opened; and a metallic microphone cover 20, having a plurality of openings (sound wave guide holes), and being mounted on the base 10 to cover the upper surface thereof. The bottom surface of the base 10 is provided with: a plurality of supports 13 of a square pillar shape having a low vertical height; and at least one pressure sensitive switch 12A disposed to be pressed in between the support 13 and the base 10. The pressure sensitive switch 12B is provided at an inclined surface of the base 10. The circuit substrate 30 and the microphone unit 31 are incorporated in the microphone casing 11 in a space formed by the base 10 and the microphone cover 20. The microphone unit 31 may be incorporated therein while being mounted on the circuit substrate 30, or the microphone unit 31 and the circuit substrate 30 may be separately incorporated therein. One end of the microphone cord 32 is connected to the circuit substrate 30 while the other end is extended out from the base 10 via the cord bush 33. The microphone cover 20 is detachably screwed to the base 10. In FIG. 1, in the interest of viewability (design), the microphone cover 20 is screwed to the base 10 at a single point with a single fixation screw 22 in a single boss protruding from the base 10. The microphone cover 20 may be, instead, screwed to the base 10 at a plurality of points, or fixed to the base 10 with a method using no screws such as fitting.

In the embodiment illustrated in the figure, the base 10, the microphone cover 20, and the microphone casing 11 formed of the base 10 and the microphone cover 20 have substantially rectangular planar shape. The base 10 can be of any shape, e.g., rectangular or triangular, as long as it is vertically flat. If the planar shape of the base 10 is rectangular, the microphone cover 11 preferably has a rectangular planar shape.

The support 13, which should be provided in a plurality, can be of any shape according to need. Still, a square pillar shape provides excellent stability and thus is preferable. In the embodiment as described in the figure, as the planar shape of the base 10 is rectangular, two supports 13 are disposed at a front right position and a front left position, respectively, while two more supports 13 are disposed at a rear right position and a rear left position, respectively. Accordingly, a total of four supports 13 are provided. To stably support the base 10, preferably, the four supports 13 are so disposed that lines connecting the center of each of the supports 13 form a rectangle. The supports 13 may be arbitrarily disposed. If the base 10 has a triangular planar shape, the supports 13 may be so provided at three positions that lines connecting the center of each of the supports 13 form a triangle. In this case, preferably, a total of three supports 13 are provided at the center front, the rear left, and the rear left, respectively, to ensure stability.

A material of the supports 13 can be arbitrary selected. For example, some of the supports 13 may be formed of a soft material while the others are formed of a hard material. Which support 13 should be formed of a flexible material or a hard material can be arbitrary decided. For example, in a case where the switch 12A is provided at one of the front positions of a boundary microphone having rectangular planar shape, the support 13 provided under the pressure sensitive switch 12A and the support 13 provided at another front position can be made of soft material, while the two supports 13 provided at the two rear positions can be made of a hard material. This is preferable because the supports 13 at the front positions can be compressed to make the front side of the microphone body tilt downwards with the supports 13 at the rear positions serving as supporting points to make the switch 12A readily activated. The switch 12A can be provided on the support 13 made of hard material. Still, the switch 12A is preferably provided on the support 13 made of a soft material to make the support 13 made of hard material serve as a supporting point as described above. The pressure sensitive switch 12A can be provided at the two front positions. The pressure sensitive switch 12A can have self maintaining circuit. In such a case, if the pressure sensitive switch 12A is provided at two positions, a difference in pressure sensing may be generated between the two positions that could lead to malfunctioning and on/off control becomes complicated. Therefore, the pressure sensitive switch 12A is preferably provided at a single position. If the base 10 has a triangular planar shape and three supports 13 are respectively provided at the positions near the corners at the bottom surface thereof, preferably, the support 13 provided at the front side of the base 10 is made of soft material with the pressure sensitive switch 12A provided thereon, while the two supports 13 provided at the left and right rear positions, respectively are made of hard material to provide high stability and operability. Generally, the support 13 of the boundary microphone is required to absorb vibration and thus is made of rubber or silicone foam. While the soft material and the hard material can be arbitrary selected, preferably, the soft material is made of rubber having hardness of 30, while the hard material is made of rubber having hardness of 60 so that a vibration can be absorbed while providing a stable structure.

At least one pressure sensitive switch 12A is provided on the bottom surface of the base 10. The pressure sensitive switch 12A is provided to be pressed between the support 13 and the base 10. Thus, the pressure sensitive switch 12A is turned on and off by being pressed between the base 10 and the support 13 due to a downward pressing on the upper surface of the base 10 or the upper side of the microphone body by the user. The pressure sensitive switch 12A may be provided on the bottom surface of the base 10 of the boundary microphone or on the surface of the support 13 facing the base 10. A position on the surface of the base 10 at which the pressure sensitive switch 12A is provided can be arbitrarily set as long as it is between the support 13 and the base 10 and is at the bottom surface of the base 10. Therefore, a user can press an arbitrary portion of the boundary microphone body as long as the pressure is applied to the position at which the support 13 and the pressure sensitive switch 12A are provided. If a mark (not shown) is provided that represents a pressing position of the pressure sensitive switch 12B is provided on the inclined surface at the front upper surface of the base 10, the pressure sensitive switch 12A is preferably provided between the support 13 and the bottom surface of the base 10 at the front portion of the microphone body at the inclined surface side to provide high operability.

In FIG. 1, the pressure sensitive switch 12B is provided on the inclined surface at the upper front side of the base 10. Therefore, even if the pressure sensitive switch 12B cannot be turned on or off by, for example, the dispersion of the pressing force of the user applied to the pressure sensitive switch 12B due to the inclination like the conventional boundary microphone, the pressure sensitive switch 12A can be turned on and off with the pressing force applied to the pressure sensitive switch 12B. It is to be noted that, a circuit is used that is appropriately designed to inactivate the pressure sensitive switch 12A if the pressure sensitive switch 12B is appropriately turned on or off. If at least one pressure sensitive switch 12A is provided, the pressure sensitive switch 12B may not necessarily be provided.

Generally, the base 10 is formed by casting such as zinc die casting. Instead, the base 10 may be a pressed metal material. The microphone cover 20 is generally a punching plate (porous plate) made by forming a multiple holes on a metal plate. The microphone cover 20 may instead be a wire meshed body.

Generally, the microphone, unit 31 in a boundary microphone is a capacitor microphone having an impedance converter. The circuit substrate 30 includes a tone control circuit and a sound output circuit, both of which are not illustrated. As described above, one end of the microphone 32 is connected to the circuit substrate 30 while the other end is extended out from the base 10 via the cord bush 33. In a wireless boundary microphone, an antenna serving as a transmission unit is provided on the microphone casing 11. In an optical wireless boundary microphone, a light emitting diode, for example, is provided thereon.

Figure 2:
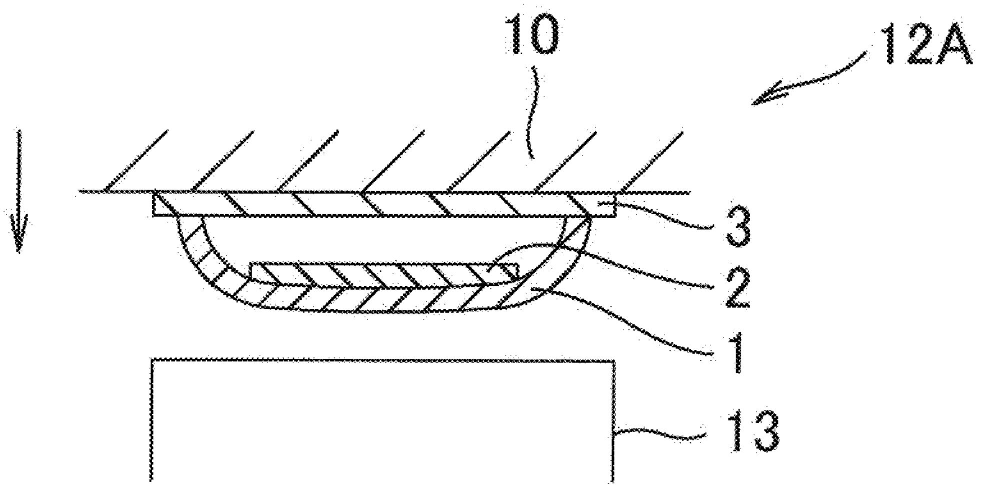
FIG. 2 is a cross-sectional view of an example of a pressure sensitive switch that can be used in a desktop electro-acoustic transducer according to the present invention.

Various structures of the switch 12A are exemplified with reference to FIGS. 2 to 5. In FIG. 2, the switch 12A is formed of a membrane 1, a copper foil 2, and a circuit substrate 3. The circuit substrate 3 of the switch 12A is attached onto the bottom surface of the base 10 with appropriate technique so that a patterned section thereof faces the support 13. The copper foil 2 is attached onto the membrane 1 of the switch 12A with an appropriate technique and faces the circuit substrate 3. As illustrated in the figure, the portion of the membrane 1 around the portion where the copper foil 2 is attached has a parabolic shape due to the shape of the membrane 1 and the elastic force of the copper foil 2. Thus, a space is formed between the copper foil 2 and the circuit substrate 3. The pattern for detecting conduction is formed on the surface of the circuit substrate 3 facing the copper foil 2. If the copper foil 2 becomes in contact with the patterned section on the circuit substrate 3, the circuit is disconnected to make the pressure sensitive switch 12A conductive. The membrane 1 is adhered on to the circuit substrate 3 at the peripheral area of the patterned section.

Preferably, a spacer (not illustrated) is provided between the membrane 1 and the circuit substrate 3 for preventing malfunctioning of the pressure sensitive switch 12A due to accidental contacting. The pressure sensitive switch 12A may not necessarily be of the membrane type but may instead be a push switch of a capacitance type, a mechanical type, or the like as required. Still, the membrane type is preferable because no switching sound is produced therewith. With the above structure only, the base 10 has to be kept pressed downwardly to keep the pressure sensitive switch 12A turned on. Therefore, the pressure sensitive switch 12A preferably includes a self-maintaining circuit (not illustrated) so that the pressure sensitive switch 12A can be kept turned on if the copper foil 2 is separated from the circuit substrate 3. In a case where a self-maintaining circuit is used, it is especially preferred if the pressure sensitive switch 12A is disposed at a single position. This is because if the pressure sensitive switch 12A is provided at more than one position, malfunctioning is more likely to occur due to a difference in sensing and on/off control of the switch becomes complicated.

With the above structure, when the user presses the pressure sensitive switch 12B illustrated in FIG. 1, or a surrounding area thereof, the bottom of the base 10 moves downward so that the pressure sensitive switch 12A of a membrane type is pressed by being sandwiched by the support 13 and the base 10. Thus, the copper foil 2 becomes in contact with the patterned section of the circuit substrate 3 to make the pressure sensitive switch 12A conductive. A material for the membrane 1 can be arbitrary selected. Still, in terms of flexibleness, a resin film is preferred.

Figure 3:
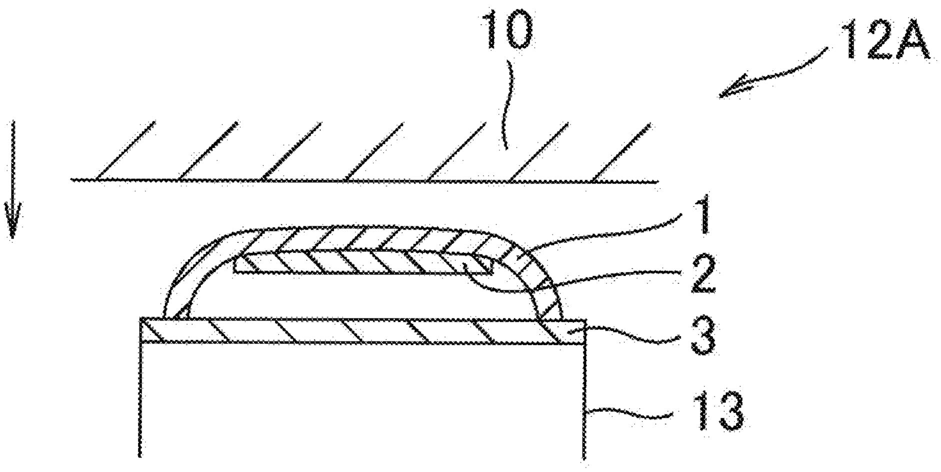
FIG. 3 is a cross-sectional view of another example of a pressure sensitive switch that can be used in the desktop electro-acoustic transducer according to the present invention.

In FIG. 3, the structure of the pressure sensitive switch 12A is an upside down version of that illustrated in FIG. 2. Here, the pressure sensitive switch 12A is attached on the upper surface of the support 13 with an appropriate technique. The circuit substrate 3 of the pressure sensitive switch 12A is attached on the surface of the support 13 facing the base 10. The copper foil 2 is attached to the membrane 1 of the pressure sensitive switch 12A with an appropriate technique. The following description is omitted because the structure is simply an upside down version of that illustrated in FIG. 2. With this structure, as in that illustrated in FIG. 2, when the user presses the pressure sensitive switch 12B illustrated in FIG. 1, or surrounding area thereof, the bottom of the base 10 moves downward so that the pressure sensitive switch 12A of a membrane type is pressed by being sandwiched by the support 13 and the base 10. Thus, the copper foil 2 becomes in contact with the patterned section of the circuit substrate 3 to make the pressure sensitive switch 12A conductive.

Figure 4:
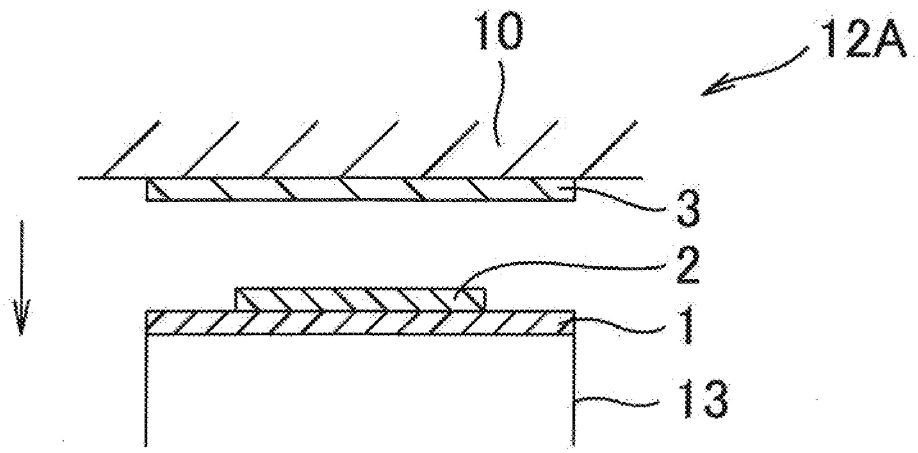
FIG. 4 is a cross-sectional view of still another example of a pressure sensitive switch that can be used in the desktop electro-acoustic transducer according to the present invention.
Figure 5:
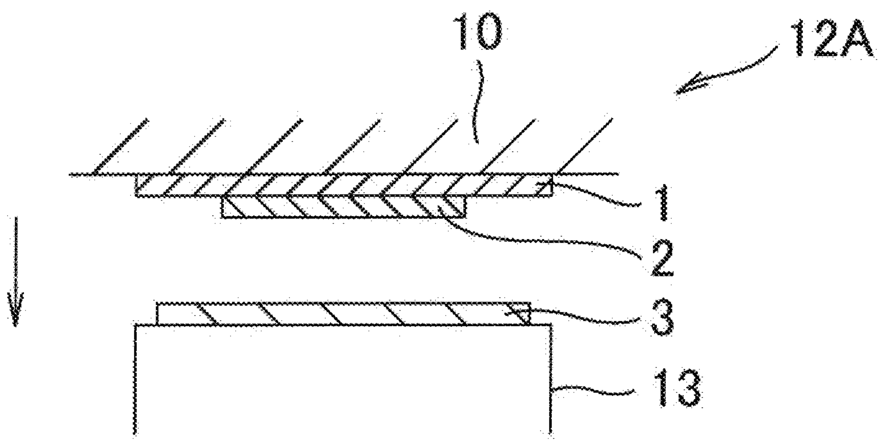
FIG. 5 is a cross-sectional view of yet still another example of a pressure sensitive switch that can be used in the desktop electro-acoustic transducer according to the present invention.

In the pressure sensitive switch 12A illustrated in FIG. 4, the circuit substrate 3 is attached to the bottom surface of the base 10 with an appropriate adhering technique. The patterned section of the circuit substrate 3 faces the support 13. The membrane 1 is adhered on the upper surface of the support 13 with an appropriate adhering technique. The copper foil 2 is adhered to the surface of the membrane 1 facing the bottom surface of the base 10. The structure of the pressure sensitive switch 12A illustrated in'FIG. 5 is an upside down version of that illustrated in FIG. 4. Thus, the circuit substrate 3 is attached to the upper surface of the support 13 with an appropriate adhering technique with the patterned section thereof facing the bottom surface of the base 10. The membrane 1 is adhered to the bottom surface of the base 10. The copper foil 2 is adhered to the surface of the membrane 1 facing the support 13. Also in the structure in which the membrane 1 and the circuit substrate 3 are not integrally formed, if the pressure sensitive switch 12B shown in FIG. 1 or the surrounding area thereof is pressed, the patterned section of the circuit substrate 3 and the copper foil 2 can be in contact to make the pressure sensitive switch 12A conductive as described above.

Figure 6:
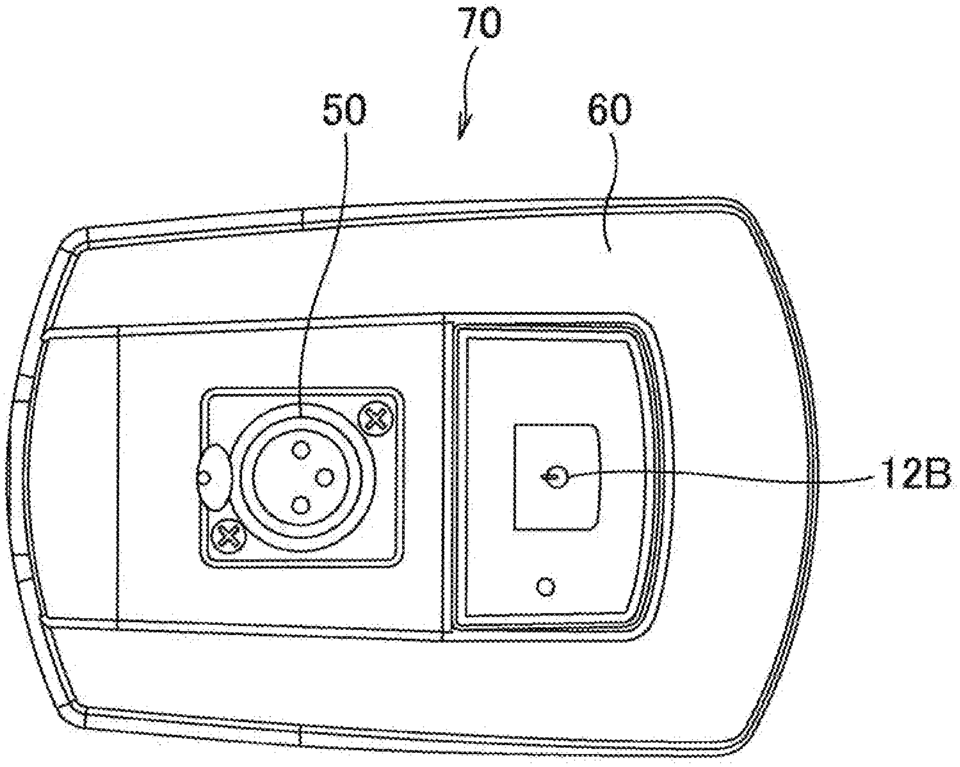
FIG. 6 is a top view of a microphone stand as an example of the desktop electro-acoustic transducer according to the present invention.

An embodiment of a desktop electro-acoustic transducer illustrated in FIG. 6 is described below. In this embodiment, a desktop electro-acoustic transducer takes a form of a microphone stand. A microphone stand serves as a platform for fixing, for example, a gooseneck microphone and the like on a desk as disclosed in Japanese Patent No. 3905223.

Figure 7:
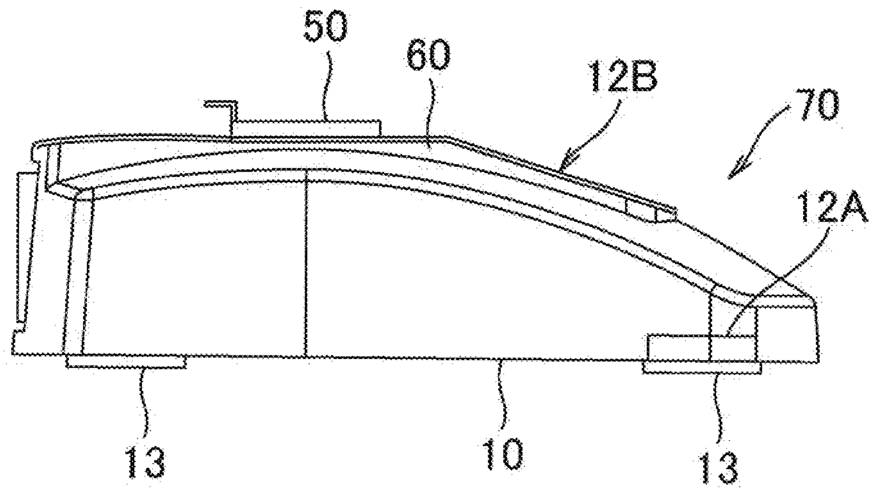
FIG. 7 is a side view of the microphone stand as the example of the desktop electro-acoustic transducer according to the present invention.

In FIGS. 6 and 7, this microphone stand 70 mainly includes the base 10, the supports 13, the pressure sensitive switches 12A and 12B, a cover 60, and a connector 50. The base 10 is designed to be flat with restricted height and a rectangular planar shape as in the embodiment described with reference to FIG. 1. Similarly, the cover 60 covering the upper surface of the base 10 is designed to be flat with restricted height, and has a rectangular planar shape. The cover 60 bas, at the front upper portion, an inclined surface at which the pressure sensitive switch 12B is provided. The pressure sensitive switch 12A is provided on the bottom surface of the base 10 with the support 13 provided thereunder. Therefore, the pressure sensitive switch 12A is provided to be pressed with the bottom surface of the base 10 and the support 13. The connector 50 via which an accessory such as a microphone (not illustrated) can be detachably attached is provided at substantially center of the upper surface of the cover 60.

Figure 8:
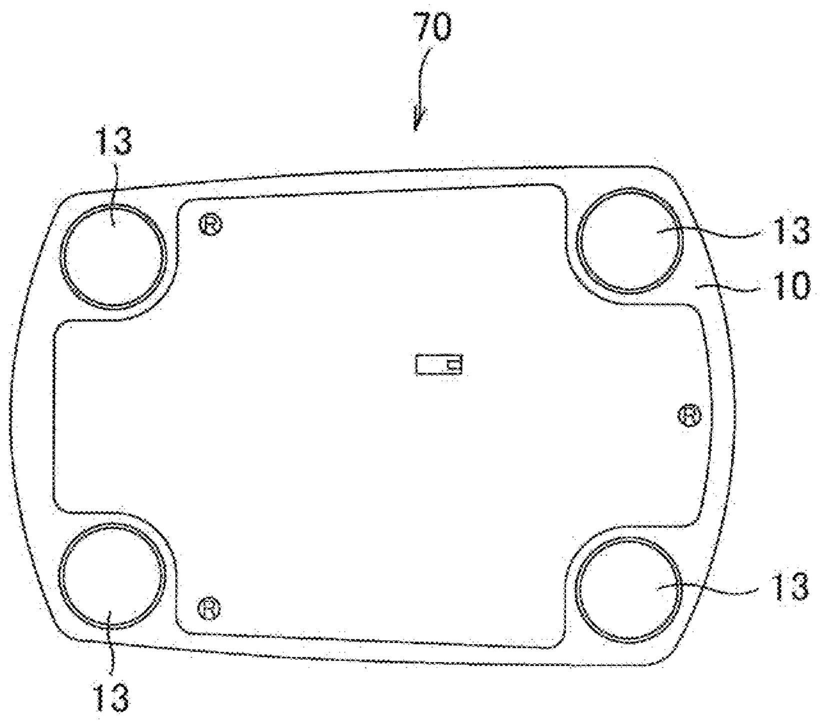
FIG. 8 is a bottom view of the microphone stand as the example of the desktop electro-acoustic transducer according to the present invention.

As shown in FIG. 8, the supports 13 are provided on each of the four corners of the base 10, which has a rectangular planar shape, for the stability of the microphone stand body. Here, as in the description with reference to FIG. 1, the pressure sensitive switch 12A is provided on either of the two supports 13 at the front side. The support 13 with the pressure sensitive switch 12A and another support 13 at the front side are made of soft material, while two supports 13 at the rear side are made of hard material. This is preferable because the front supports 13 can be compressed to make the front side of the microphone body tilt downwards with the two rear side supports 13 serving as supporting points to make the pressure sensitive switch 12A readily activated. The pressure sensitive switch 12A may be provided on the upper surface of the support 13 made of hard material. Still, as described above, the pressure sensitive switch 12A is preferably provided on the support 13 made of soft material to allow the pressing to be performed with the support 13 made of hard material serving as a supporting point. The pressure sensitive switch 12A preferably includes a self-maintaining circuit (not illustrated) so that the base 10 may not be kept at a certain position to keep the pressure sensitive switch 12A turned on. In other words, constant pressing by the user is not required. Here, it is especially preferable to provide the pressure sensitive switch 12A at a single position because with the pressure sensitive switch 12A provided at two or more positions, malfunctioning is more likely to occur due to the difference in sensing and the on/off control of the switch becomes complex. The planar shape of the base 10 and the cover 60 in the microphone stand 70 can be arbitrarily selected and can be triangular or rectangular. The cover 60 can be made of appropriate materials such as plastic and metal.

In FIG. 7, the pressure sensitive switch 12A is provided at least a position of the front position to be pressed by the bottom surface of the base 10 and the support 13 with the structure illustrated in FIG. 1. That is, the microphone stand 70 has a mechanism of the pressure sensitive switch 12A similar to those illustrated in FIGS. 1, 2, 3, 4, and 5. Due to such designing, the pressure sensitive switch 12A of the microphone stand 70 turns on and off with the pressure sensitive switch 12B or its periphery pressed downwards by the user. An accessory such as a microphone (not illustrated) can be detachably attached on the microphone stand 70 via the connector 50. Thus, an external accessory such as a gooseneck microphone can be turned on and off with the pressure sensitive switch 12A of the microphone stand 70. The microphone stand 70 apart, from the pressure sensitive switch 12A can be configured differently as required. For example, a gooseneck microphone having a flexible pipe used in the invention disclosed in Japanese Patent No. 3905223 can be detachably attached onto the microphone stand 70 via the connector 50. The base 10, the supports 13, and the pressure sensitive switch 12A of the microphone stand 70 have the structures similar to those illustrated in FIGS. 1, 2, 3, 4, and 5 and thus the detail descriptions thereof are omitted.

Another embodiment of a desktop electro acoustic transducer is described with reference to FIG. 9. Here, a desktop electro-acoustic transducer takes a form of a microphone with attached speaker. A microphone with attached speaker is a desktop electro acoustic transducer used in a telephone conference and the like to serve as both microphone and speaker, such as an invention disclosed in Japanese Patent Application Publication 2005-312041, for example.

Figure 9:
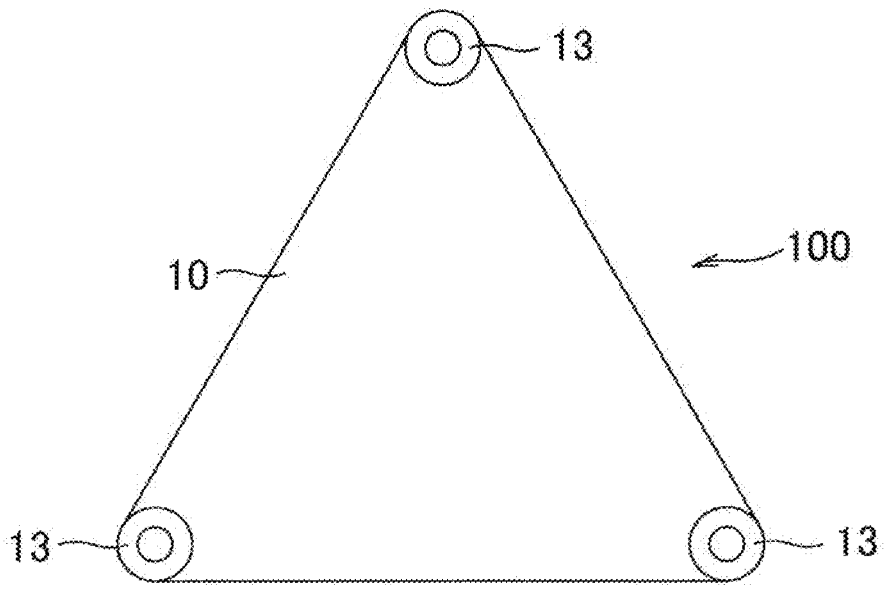
FIG. 9 is a bottom view of a speaker with attached microphone as an example of the desktop electro-acoustic transducer according to the present invention.
Figure 10:
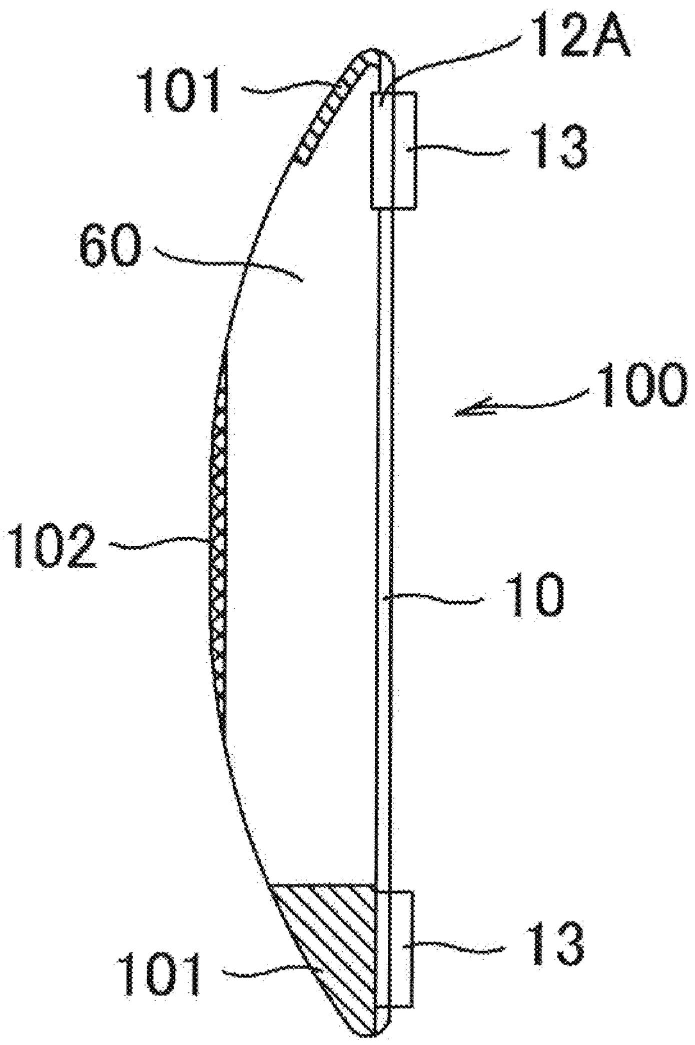
FIG. 10 is a side view of the speaker with attached microphone as the example of the desktop electro-acoustic transducer according to the present invention.
Figure 11:
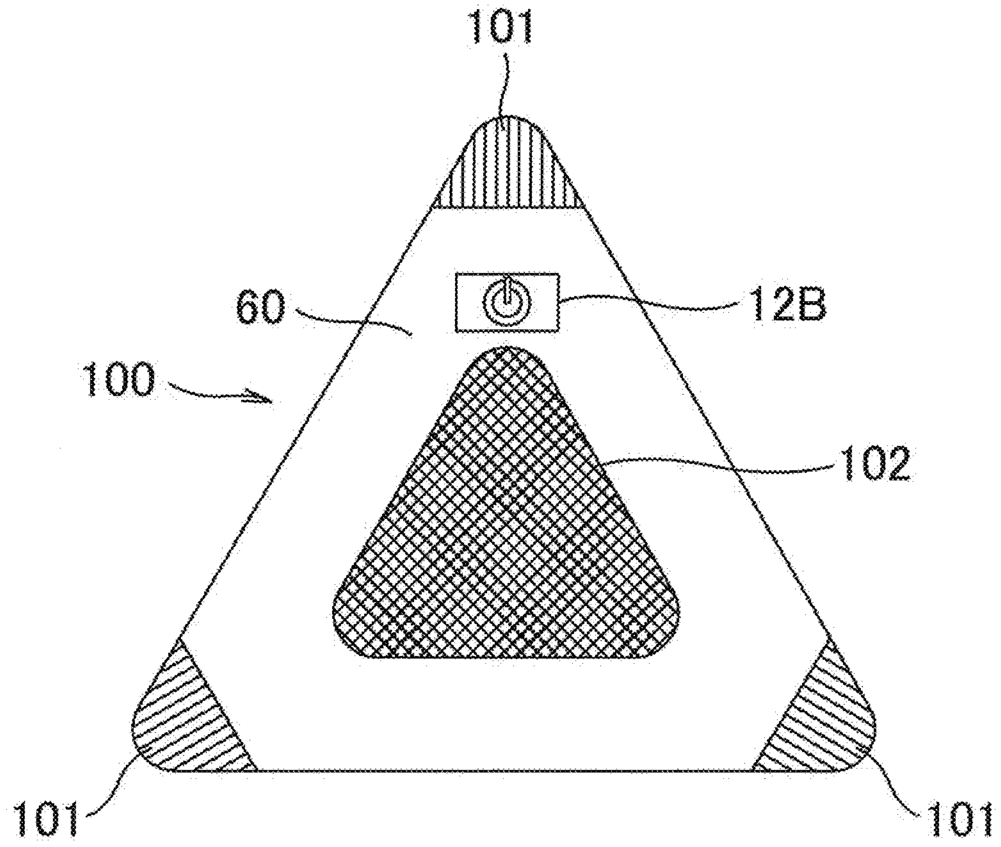
FIG. 11 is a plane view of the speaker with attached microphone as the example of the desktop electro-acoustic transducer according to the present invention.
Figure 12:
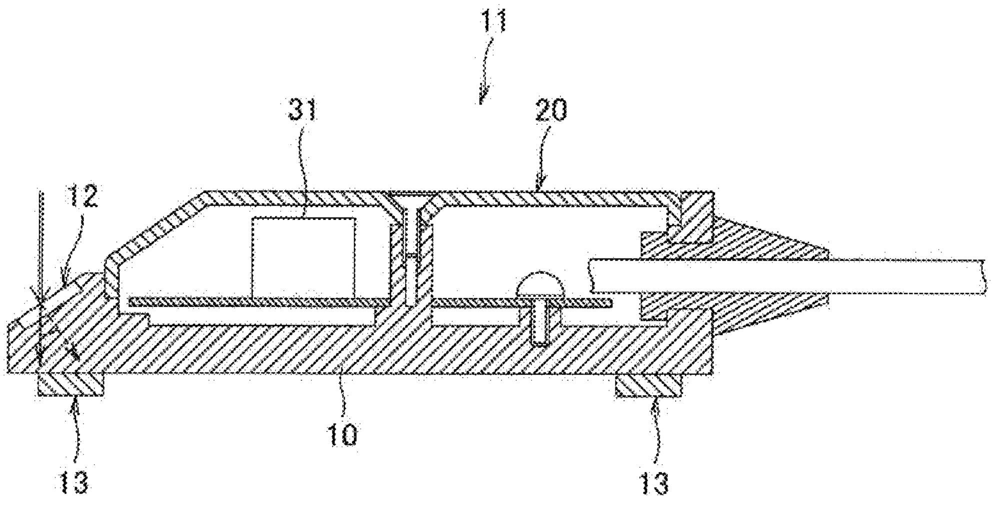
RELATED ART FIG. 12
FIG. 12 is a cross-sectional view of a conventional boundary microphone.

In FIGS. 9, 10, and 11, this microphone with attached speaker 100 of the embodiments mainly includes: the base 10; the supports 13; the pressure sensitive switches 12A and 12B; the cover 60; a microphone 101; and a speaker 102. The base 10 is designed to be flat with restricted height, and has a triangular planar shape. Similarly, the cover 60 is designed to be flat with restricted height, and has a triangular planar shape. As illustrated in FIG. 9, three supports 13 are respectively provided at positions near the corners of the bottom surface of the base 10 having the triangular planar shape. As illustrated in FIG. 10, the pressure sensitive switch 12B is provided at an inclined surface at the upper front portion of the cover 60. An air hole for the microphone 102 is provided at substantially center of the upper surface of the cover 60. Air holes for the speaker 101 are provided at the positions near the corners of the triangle in the planar view. The speaker 101 and the microphone 102 are provided in a space (not illustrated) formed by the base 10 and the cover 60. The structures of other portions are similar to, for example, those of the invention disclosed in Japanese Patent Application Publication 2005-312.041.

In FIGS. 9, 10, and 11, in the microphone with attached speaker 100, the mechanism of the pressure sensitive switch 12A is similar to those in the boundary microphone described with reference to FIGS. 1, 2, 3, 4, and 5. More specifically, as illustrated in FIG. 10, the pressure sensitive switch 12A is provided on the bottom surface of the base 10 of the microphone with attached speaker 100. The microphone with attached speaker 100 includes the cover 60 covering the upper surface of the base 10, and a plurality of supports 13 on the bottom surface of the base 10. The pressure sensitive switch 12B is provided at the upper front portion of the cover 60. With such a structure, the pressure sensitive switch 12A is turned on and off by being pressed by the base 10 and the supports 13, as a result of the downward pressing of the pressure sensitive switch 12B or its peripheral area by the user.

The microphone with attached speaker 100 can have a structure capable of being connected with a cellular phone and the like as in the invention disclosed in Japanese Patent Application Publication 2005-312041. The microphone with attached speaker 100 as illustrated in FIGS. 9, 10, and 11 has a triangular planar shape. Thus, the supports 13 are respectively provided at three positions near the three corners. Preferably, one support 13 made of soft material is provided at the front center position of the base 10, while two supports 13 made of hard material are each provided on the rear left position and the rear right position of the base 10 so that total of three supports 13 are provided, and one pressure sensitive switch 12A is provided on the upward position of the support 13 at the front. The planar shape of the base 10 and the cover 60 in the microphone with attached speaker 100 can be arbitrary set, and can be triangular or rectangular for example. The cover 60 can be made of arbitral material and can be made of, for example, plastic or metal. In the above structure, if there is no self-maintaining circuit, another composition element is required since the base 10 must be kept at a certain position to keep the pressure sensitive switch 12A turned on. Therefore, preferably, the pressure sensitive switch 12A further includes the self-maintaining switch (not illustrated). Here, if the pressure sensitive switch 12A is provided at more than a single position, a malfunction is more likely to occur due to the difference in sensing and the on/off control of the switch becomes complicated. Therefore, the pressure sensitive switch 12A is preferably provided at a single position.

Detail structures of the base 10, the supports 13, and the pressure sensitive switch 12A of the microphone with attached speaker 100 are only different from those in the above description with reference to FIGS. 1, 2, 3, 4, and 5, in that the planar shape of the base 10 is triangular, and thus the description thereof is omitted.

The boundary microphone and the desktop electro-acoustic transducer according to the present invention are not limited in the structures of the above described embodiments. More specifically, the pressure sensitive switch of the boundary microphone and the desktop electro-acoustic transducer according to the present invention can be used in an appropriate desktop electro-acoustic transducer such as: a boundary microphone; a microphone stand and its accessory; a speaker; and a microphone with attached speaker. Further, the scope of the present invention includes not only a desktop electro-acoustic transducer placed on a horizontal surface, but also one attached on a vertical surface to serve as, for example, an interphone.

What is claimed is:

1. A boundary microphone comprising:
a base having a flat shape;
a support provided on a bottom surface of the base;
a microphone unit incorporated in the base and converts sound into an electric signal; and
at least one pressure sensitive switch to turn on and off an output signal from the microphone unit, wherein
said at least one pressure sensitive switch is configured to be pressed between the base and the support and is actuated by pressing force by the user.

2. The boundary microphone according to claim 1, wherein
a plurality of supports is provided,
the supports include a support formed of a soft material and a support formed of a hard material, and
the pressure sensitive switch is provided on the support foilled of a soft material.

3. The boundary microphone according to claim 1, wherein the pressure sensitive switch is provided between the bottom of the base and the support, and on an upper surface of the base.

4. The boundary microphone according to claim 1, wherein the pressure sensitive switch is turned on or off by the upper front portion of the base being pressed downwardly.

5. The boundary microphone according to claim 1, wherein the pressure sensitive switch is of a membrane type.

6. A desktop electro-acoustic transducer comprising:
a base having a flat shape;
a support provided on a bottom surface of the base;
an electro-acoustic transducing unit incorporated in the base; and
at least one pressure sensitive switch to turn on and off an output signal from the electro-acoustic transducing unit, wherein
said at least one pressure sensitive switch is configured to be pressed between the base and the support and is actuated by pressing force by the user.

7. The desktop electro-acoustic transducer according to claim 6, wherein the pressure sensitive switch is provided between the bottom of the base and the support, and on an upper surface of the base.

8. The desktop electro-acoustic transducer according to claim 6, wherein
a plurality of supports is provided,
the supports include a support formed of a soft material and a support formed of a hard material, and
the pressure sensitive switch is provided on the support formed of a soft material.

9. The desktop electro-acoustic transducer according to claim 6, wherein the pressure sensitive switch is turned on by pressing a front upper surface of the base downward and is turned off by releasing the pressing force.

10. The desktop electro-acoustic transducer according to claim 6, wherein
the electro-acoustic transducing unit is a microphone unit, and
the microphone unit is detachably attached via a connector provided on the base.

11. The desktop electro-acoustic transducer according to claim 6, wherein the pressure sensitive switch is a switch of a membrane type.

* * * * *

UNITED STATES PATENT AND TRADEMARK OFFICE

CERTIFICATE OF CORRECTION

PATENT NO. : 8,442,256 B2
APPLICATION NO. : 12/788880
DATED : May 14, 2013
INVENTOR(S) : Satoshi Yoshino It is certified that error appears in the above-identified patent and that said Letters Patent is hereby corrected as shown below:

In the claims, column 10, claim 2, lines 5 and 6; Delete “foil led” and insert --formed--.

Signed and Sealed this
Thirtieth Day of July, 2013

Teresa Stanek Rea
*Acting Director of the United States Patent and Trademark Office*